(12) United States Patent
Lamarre

(10) Patent No.: US 7,164,462 B2
(45) Date of Patent: Jan. 16, 2007

(54) FILMING USING REAR-PROJECTION SCREEN AND IMAGE PROJECTOR

(75) Inventor: Louise Lamarre, 3541 Ethel, Verdun, QC (CA) H4G 1R9

(73) Assignee: Louise Lamarre, Verdun (CA)

(*) Notice: Subject to any disclaimer, the term of this patent is extended or adjusted under 35 U.S.C. 154(b) by 140 days.

(21) Appl. No.: 10/791,147

(22) Filed: Mar. 3, 2004

(65) Prior Publication Data

US 2005/0195365 A1 Sep. 8, 2005

(51) Int. Cl.
*G03B 19/18* (2006.01)
*A63J 5/00* (2006.01)

(52) U.S. Cl. .......................... 352/47; 352/89
(58) Field of Classification Search .............. 352/47, 352/48, 88, 89, 38, 44
See application file for complete search history.

(56) References Cited

U.S. PATENT DOCUMENTS

| 2,004,987 | A | | 6/1935 | Jackman | |
|---|---|---|---|---|---|
| 2,027,028 | A | * | 1/1936 | Douden | 352/89 |
| 2,127,656 | A | * | 8/1938 | Terry | 352/51 |
| 2,147,030 | A | * | 2/1939 | Haskin | 254/1 |
| 2,260,299 | A | * | 10/1941 | Cunningham et al. | 352/89 |
| 2,275,270 | A | | 3/1942 | Rackett | |
| 2,310,339 | A | * | 2/1943 | Arndt | 318/625 |
| 2,968,211 | A | * | 1/1961 | Newhall | 352/53 |
| 3,039,357 | A | * | 6/1962 | Eagle | 396/3 |
| 4,067,026 | A | | 1/1978 | Pappanikolaou | |
| 4,100,572 | A | | 7/1978 | Perisic | |
| 4,283,766 | A | * | 8/1981 | Snyder et al. | 382/293 |
| 4,548,468 | A | | 10/1985 | Anthony | |
| 5,061,061 | A | | 10/1991 | Robley | |
| 5,949,433 | A | | 9/1999 | Klotz | |
| 6,122,013 | A | | 9/2000 | Tamir | |
| 6,646,687 | B1 | | 11/2003 | Vlahos | |
| 2001/0036319 | A1 | | 11/2001 | Sakaida | |
| 2003/0222892 | A1 | * | 12/2003 | Diamond et al. | 345/647 |

* cited by examiner

*Primary Examiner*—Rodney Fuller
(74) *Attorney, Agent, or Firm*—Ogilvy Renault LLP

(57) ABSTRACT

A method for controlling a depth of field when filming a scene. A rear-projection screen behind a subject in a foreground is provided. An image is projected onto the rear-projection screen to act as a background for the scene. The scene is filmed including the foreground and the background. A varying degree of focus is applied to a plurality of objects in the image as a function of a degree of focus of each of the objects for an intended distance between each of the objects and the subject.

14 Claims, 6 Drawing Sheets

FILMING USING REAR-PROJECTION SCREEN AND IMAGE PROJECTOR

CROSS-REFERENCE TO RELATED APPLICATIONS

This is the first application filed for the present invention.

STATEMENT REGARDING FEDERALLY SPONSORED RESEARCH OR DEVELOPMENT

Not Applicable.

TECHNICAL FIELD

The present application is related to the field of motion pictures and image projectors, and more specifically to the field of recording methods with projected picture components combined with real objects.

BACKGROUND OF THE INVENTION

Digital cameras and regular video cameras provide a depth of field that is too great for filming realistic views for a movie. All of the objects in the image appear to be on the same plane. This is an undesirable effect when filming a movie. As a result, the existing methods used for recording motion pictures involve either using very old and heavy filming equipment that will provide the necessary depth of field, or using chroma-keying techniques (blue or green back screens) in combination with photo and video editing software to replace the blue or green screen with an actual background in the post-production phase of the process.

The old filming equipment is cumbersome and difficult to use. Additionally, there may be instances where it is impossible for an entire film crew to go to an exotic location in order to film a scene with the right background. In these cases, the chroma-keying technique is used. However, this technique has many disadvantages. First of all, the actors in the scene cannot see the background that will eventually replace the blue or green screen. Therefore, a certain level of coordination is required on the part of the actors to approximate the location of different features of the background to portray a sense of realism for the final product.

Additionally, the blue or green screen must be lit in a uniform manner in order to completely disappear in post-production. Therefore, the lighting that can be provided for the actual scene is limited in its capacity to be contrasting or nuanced. Furthermore, replacing the blue or green screen with the actual background in the post-production phase is a costly and sophisticated process that requires specially skilled technicians who can work with different editing tools.

Moreover, there is a need for a new method that will replace the use of the chroma-keying technique while providing high quality motion pictures.

SUMMARY OF THE INVENTION

It is an object of the present invention to overcome the drawbacks of the state of the art.

In accordance with a first broad aspect of the present invention, there is provided a method for synchronizing a background action sequence with a foreground action sequence, the method comprising: projecting the background action sequence on a rear-projection screen; providing the foreground action sequence in front of the rear-projection screen; and causing a change in the background action sequence as a function of and in accordance with action occurring in the foreground action sequence.

Preferably, a human operator causes the change in the background action sequence as a result of a visual cue received by any member of the film crew.

In accordance with a second broad aspect of the present invention, there is provided a method for controlling a depth of field when filming a scene, the method comprising: providing a rear-projection screen behind a subject in a foreground; projecting an image onto the rear-projection screen to act as a background for the scene; filming the scene including the foreground and the background; and applying a varying degree of focus to a plurality of objects in the image as a function of a degree of focus of the objects for an intended distance between each of the objects and the subject.

In accordance with a third broad aspect of the present invention, there is provided a method for filming an action scene, the method comprising: providing a projector and a rear-projection screen on a trolley for motion in at least one direction; projecting an image onto the rear-projection screen to act as a background for the scene; providing foreground action in front of the rear-projection screen; filming the scene including the foreground and the background; and moving the projector and the screen along the at least one direction to follow the foreground action.

In accordance with a fourth broad aspect of the present invention, there is provided a method for synchronizing a background image with a foreground camera, the method comprising: recording the background image; providing a projector that will generate a continuously varying video image; projecting the background image onto a rear-projection screen using the projector; and acquiring the background image with a foreground image using the foreground camera.

Preferably, recording the background image comprises recording the background image using an acquisition rate that corresponds to an acquisition rate of the foreground camera.

The methods as described above allow the realization of special effects in real time by providing the possibility of combining, in the camera view, characters and/or objects of varying scales, working with models and layouts, and having real characters interact with animated characters. In addition, it becomes possible to have the action happen with an exotic location as its backdrop without requiring the displacement of an entire film crew.

Moreover, the actors can see the context within which they are performing as the action unrolls, instead of having to imagine what the background scene will look like. The director can also produce final images that do not need to be retouched in the post-production phase and the overall costs of production are reduced.

It should be understood that the features described above in accordance with any one of the first, second, third, or fourth broad aspect of the present invention can be used in combination with each other.

BRIEF DESCRIPTION OF THE DRAWINGS

Further features and advantages of the present invention will become apparent from the following detailed description, taken in combination with the appended drawings, in which.

Figure 1:
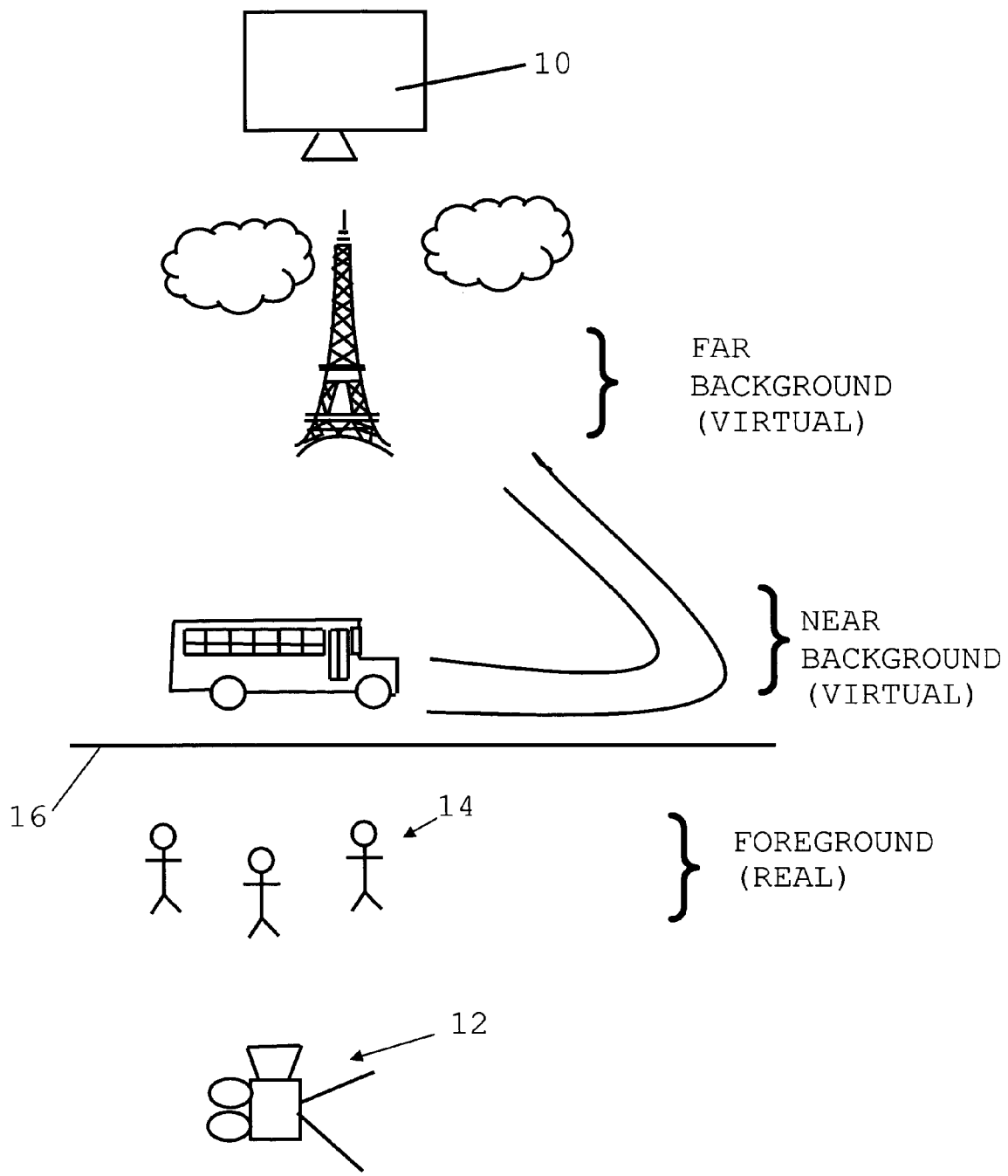
FIG. 1 illustrates the basic setup for the method in accordance with the present invention.

In this specification, the term continuously varying means that for every pixel, the intensity does not vary in any pulsatile manner.

It will be noted that throughout the appended drawings, like features are identified by like reference numerals.

DETAILED DESCRIPTION OF THE PREFERRED EMBODIMENT

FIG. 1 shows the set-up used in accordance with a preferred embodiment of the present invention. This set-up is used for the production phase of the filming process. A projector 10 is placed behind a rear-projection screen 16 and an image is projected onto the rear-projection screen 16 from behind. This image will comprise the background that is intended for the scene to be filmed. The background may have a near background and a far background, depending on the scene. In front of the rear-projection screen, actors and/or objects 14 are placed such that the background and foreground images merge together in the camera view. A camera 12 is placed in front of the actors and/or objects 14 in order to film the scene. By adjusting the focus of the image projected onto the rear-projection screen 16 using the projector 10, the back image can appear slightly out of focus and the illusion of a shortened depth of field is provided.

The background image is recorded separately, using any recording means such as a standard video camera (digital or not) or a movie camera. A video tape recorder (VTR) can then be used to provide the projector with the recorded images.

The method of the present invention allows real time depth of field control. By varying the focus of the image projected in the background, a shortened depth of field is provided, matching more realistically what usually appears to the human eye. By adjusting the focus of the image projected onto the back screen using the projector, the back image can appear slightly out of focus and the illusion of a shortened depth of field is provided. The user can decide what will be in focus and what will be out of focus and all of the images that will appear on screen are provided directly on the set. The actors can then see what the background is, instead of having to work with a blue or green screen as a fake background, as is typically the case.

The depth of field may also be provided by applying a varying degree of focus to a plurality of objects in the image as a function of a degree of focus of the objects for an intended distance between each of the objects and the subject. That is to say that not all of the objects in the background image are set to have the same degree of focus. For example, a background scene may comprise a wall with a picture frame and a window, a mountain visible in the distance through the window. The foreground scene could then have a person standing in front of the wall, next to the picture frame and the window. In this case, the focus of the picture frame and the mountain through the window should not be the same, as that would not be a realistic image.

Therefore, since the mountain (a first object) is intended to be at a larger distance from the person (the subject) than the picture frame (a second object), the focus of the two objects are set differently. The mountain is made to look a little more out-of-focus than the picture frame to create the visual effect of distance to the viewer.

In FIG. 1, a school bus is in the near background and the Eiffel tower is in the far background. It is desirable to have the school bus appear closer than the Eiffel tower. While both objects appear on the same projection screen, the two objects are provided with a different degree of focus.

This visual effect is done in various ways. Different blending and/or overlaying techniques can be used on the image to create the effect. For example, one of the objects of the background image can be set to a different level of focus manually in one image and blended into the second image. The sharpness of the objects in the combined image then vary. A scale of the objects in the image with respect to the subject in the foreground may be adjusted as well. It should be understood that the varying degree of focus may be done dynamically while filming, or in between filming while the camera is not recording. The degree of focus can then be adjusted very precisely as per the director's requirements, or any other member of the film crew. A controllable video source is used to generate the video images that will have the desired visual effects.

Alternatively, the degree of focus of the objects in the background image can be changed by having relative motion between the projector and the rear-projection screen, or between the camera and the rear-projection screen. Changing the distances between any of these devices would have an impact on the size of the objects in the background image and also the focus of the objects. A combination of movement of the projector and movement of the camera can also be used to obtain the varying degree of focus. Another approach is to add filtering lenses to the projector projecting the background image.

Figure 2:
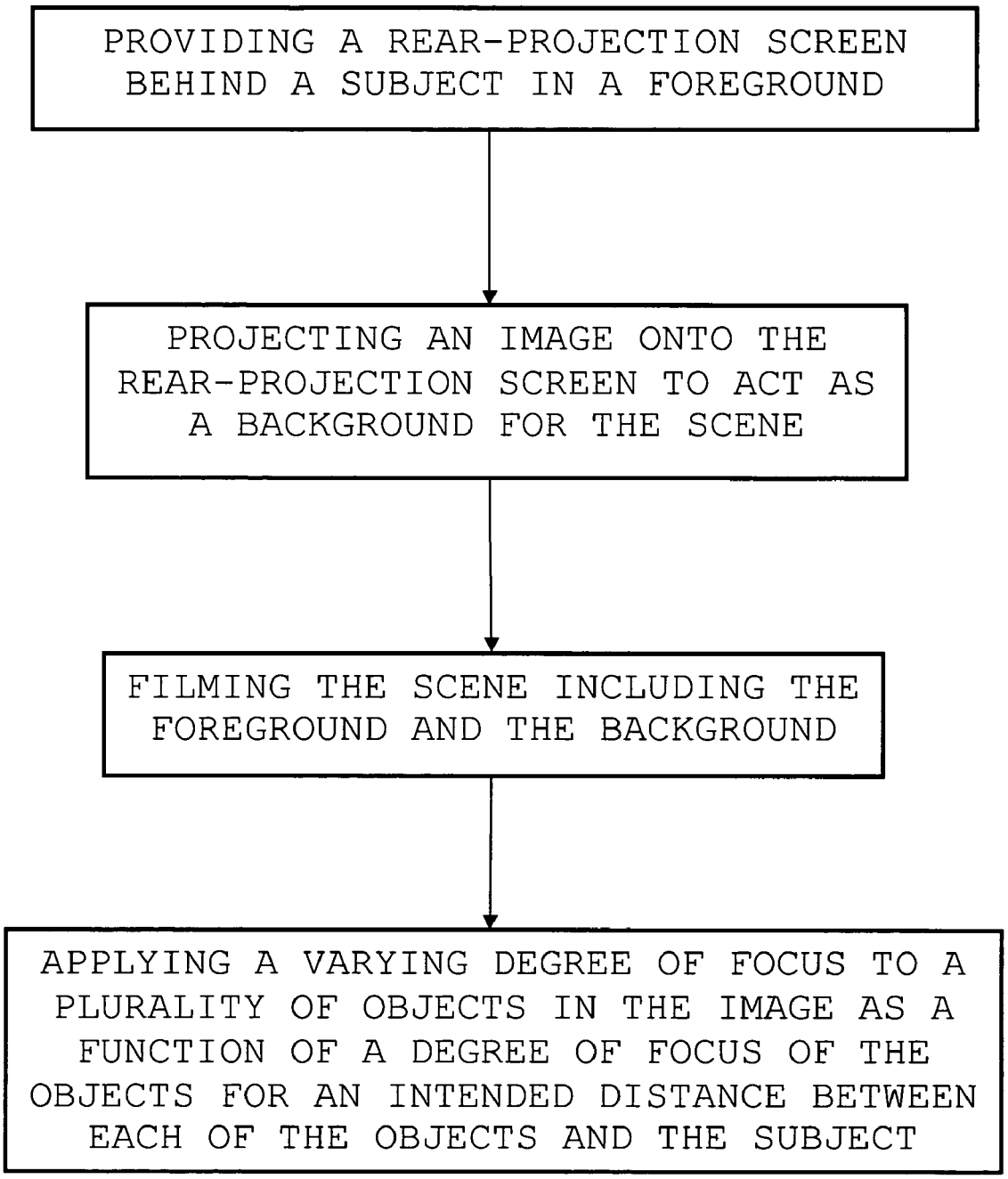
FIG. 2 is a flow chart of the method for controlling a depth of field when filming a scene.

FIG. 2 illustrates the method for controlling a depth of field when filming a scene in accordance with the present invention. A rear-projection screen is provided behind a subject in a foreground. An image is projected onto the rear-projection screen to act as a background for the scene. The scene is filmed including the background and the foreground images. A varying degree of focus is applied to a plurality of objects in the image as a function of a degree of focus of the objects for an intended distance between each of the objects and the subject The present invention also allows the user to provide special effects in real time by superimposing characters or backdrops of different scales directly on the projection screen. Animated characters can also be projected onto the projection screen and the actors in front of the screen can interact with the animated characters.

Figure 3:
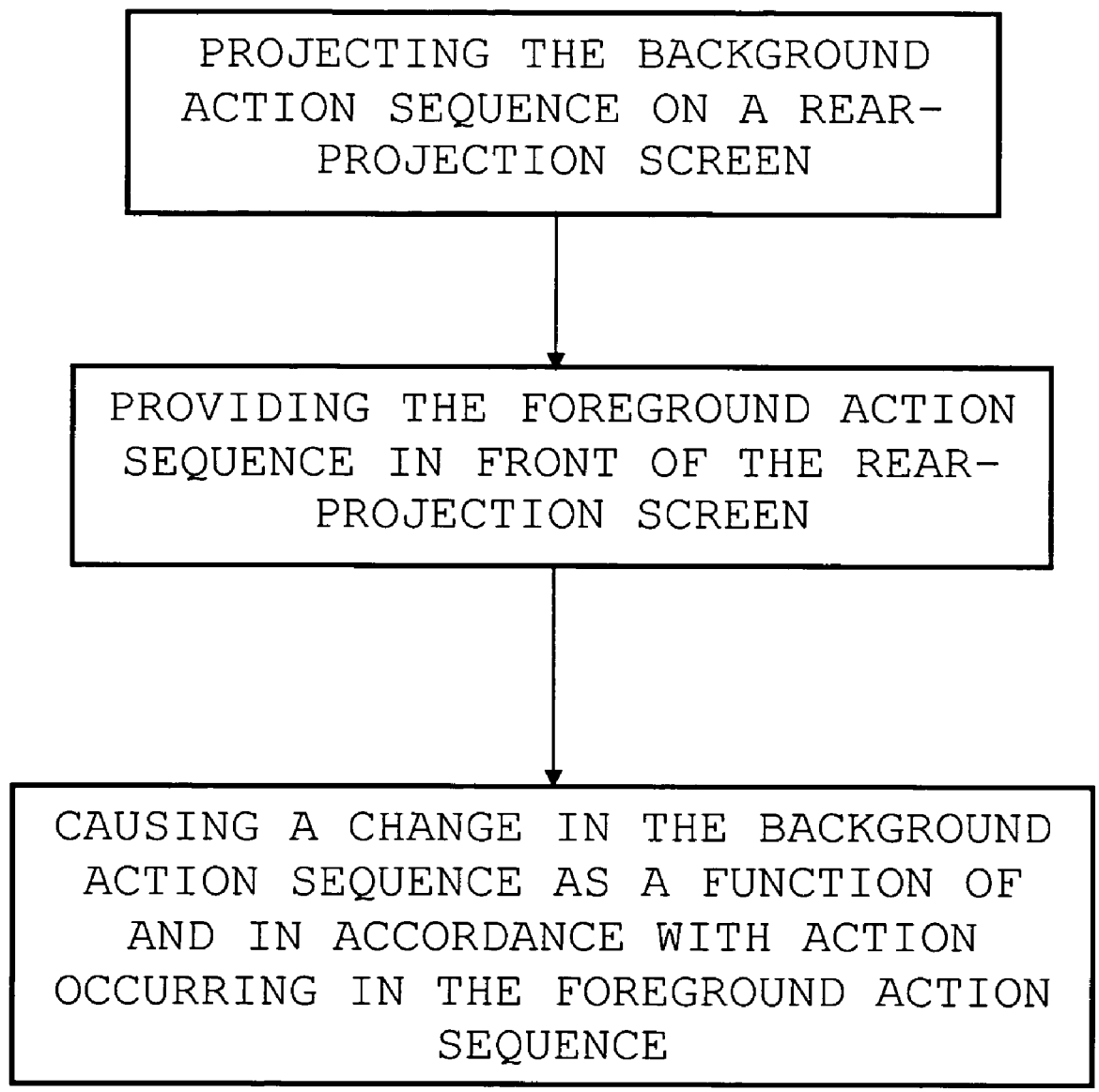
FIG. 3 is a flow chart of the method for synchronizing a background action sequence with a foreground action sequence.

FIG. 3 illustrates a method for synchronizing a background action sequence with a foreground action sequence. The background action sequence is projected onto a rear-projection screen. The foreground action sequence is provided in front of the rear-projection screen. A change in the background action sequence is caused in response to action occurring in the foreground action sequence.

For example, a scene may consist of two people sitting in a car in a foreground image and the background image is the view through the back window of the car as the car advances through the streets. Instead of synchronizing the foreground with what is happening in the background, the reverse is done. If the car appears to be stopped at a light and the driver is talking to the passenger, the driver can look up, notice that the light has changed, and do the motions required to put the car back into motion. As a result of this action, the background scene is changed from a still shot through the back window to a moving shot through the back window, giving the impression that the car has begun to advance again. However, the actor does not need to be preoccupied with the timing of the background image to perform his or her actions.

A person other than the actor, such as the director, signals the exact moment when the background scene needs to be changed as a result of the action taking place in the foreground. A human operator can be responsible for causing the change in the background scene. The human operator could react based on a visual cue. The visual cue could be given by the actors, the director, or anyone else on the film set. Alternatively, the change can be caused by a mechanism controlled by the actor performing the action. For example, in the car scene described above, the driver may have a switch that he can press to cause the change in the background scene. In this case, the actor is completely in control of coordinating the timing of his actions with the background scene.

Multiple VTRs can be connected to a projector to allow the background scene to change while filming. The different VTRs can be set to operate on timers that start and stop the projection.

The methods in accordance with the invention are applicable to all types of film or television media, such as all film formats, high definition, digital, and video.

In the pre-production phase of the process, the background image that will be projected onto the projection screen must be selected and recorded. In order to obtain the best results, pre-production images should meet certain criteria that can vary according to the content of the image, i.e. what is the user trying to portray (realism or special effects), and aesthetic choices made by the user (textures, contrasts, colors). The quality of the final result will be as a function of the realism displayed by the proportions of the projected image as compared to the actors and/or objects added to the decor.

In order to benefit from the greatest flexibility in the production phase, the recording of the background image in the pre-production phase should take into account several factors. A first is the choice of format for the collecting means used for the background image and the number of images per second that are recorded. The broadcasting format is identified, such as for example 35 mm film or television. For each type of broadcasting format, a corresponding number of images or frames per seconds applies. For example, in the case of 35 mm film, it is known that 24 frames per second are required. Therefore, the background image is recorded using 24 frames per second in order to correspond to the final format. In the case of television, 30 frames per second can be used.

A second factor is the framing. The pre-production phase must take into account that either actors or objects will be present in front of the projection screen when the scene is filmed. Therefore, a virtual space is provided between the camera and the projection screen and this spacing is used when the background image is created to be recorded. This spacing will correspond to the spacing available on the set for the actors and/or objects that will be in front of the projection screen. Generally, a partial realignment of the background image will allow it to be used more than once.

Any recording medium can be used to record the background image. The higher quality the image is, the higher quality it will appear when projected onto the projection screen. The background image will appear more realistic if a lens having a certain focal length is used. For 35 mm, the best focal length is between 28 mm and 40 mm. For 16 mm or Super 16 mm, the best focal length is between 18 mm and 24 mm. For a high definition or digital camera, or any other camera with a CCD sensor that is ⅔ of an inch in size, the best focal length to use is between 70 mm and 100 mm.

In accordance with a preferred embodiment of the present invention, a high resolution projector is used, the projector having a fixed lens and providing a minimum luminosity of 8000 Lumen. It can be appreciated that filters can be added onto the projector's lens.

Figure 4:
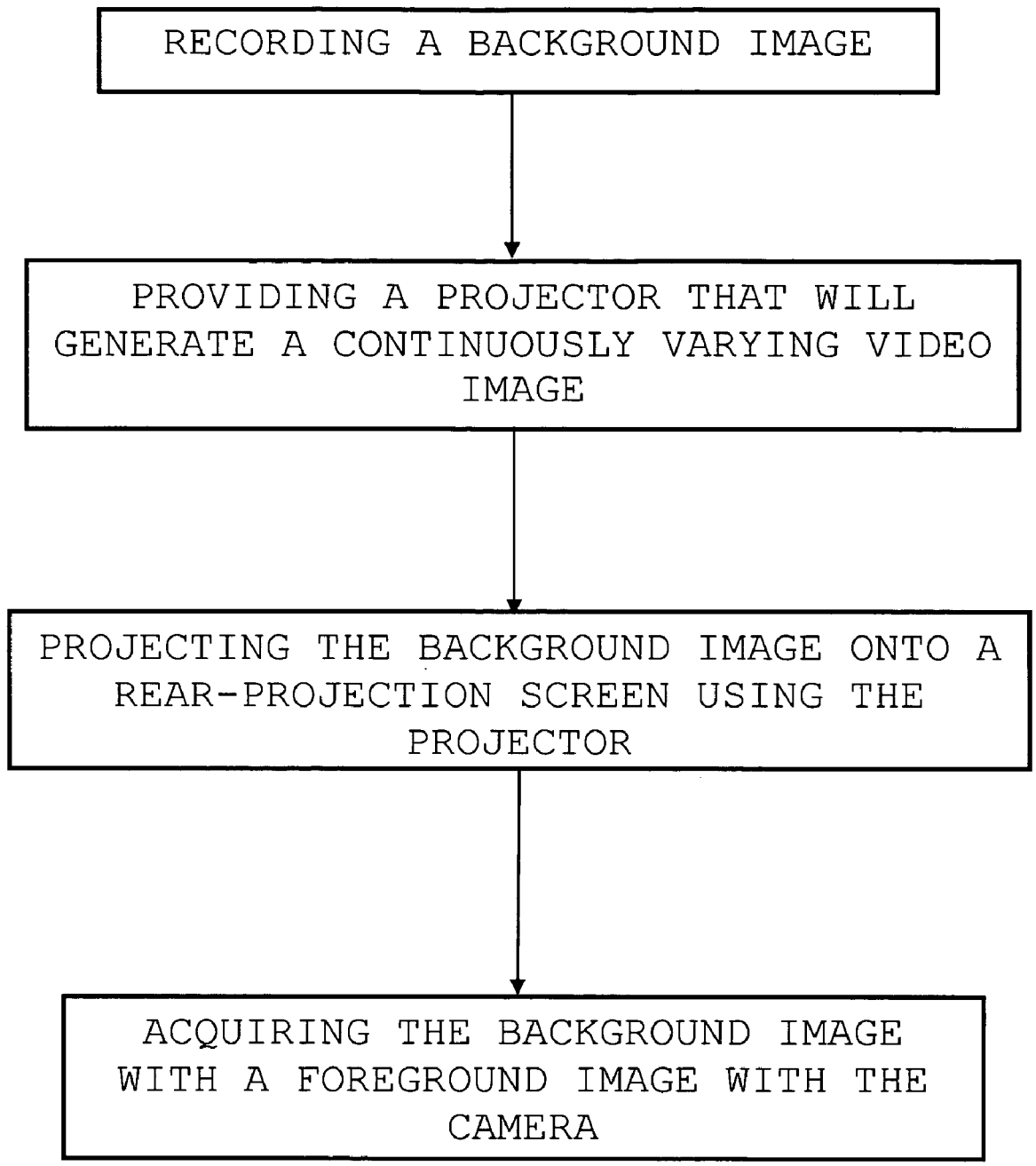
FIG. 4 is a flow chart of the method for synchronizing a background image with a foreground camera.

It is possible to have the acquisition format of the background image and the acquisition format of the camera be different while still having the background image synchronized with the camera. FIG. 4 is a flow chart of the method for synchronizing a background image with a foreground camera. The first step consists in recording the background image. This is done at any point in time before the actual filming of the scene. Different recording means can be used to record the background image. A projector that will generate a continuously varying video image is provided. Preferably, this projector is a Liquid Crystal Display (LCD) projector. It should be a broadcast quality projector. The background image is then projected onto a rear-projection screen using the projector and the background image and a foreground image are acquired using the foreground camera.

Because the projector generates a continuously varying video image, as the source image changes, the projected image gradually changes in a manner that does not create any artifacts when it is captured by a camera. The projector performs a smoothing of the signal such that it remains continuous. Therefore, the background image can be captured at a different acquisition rate than the foreground camera's acquisition rate without causing artifacts in the final product. In a preferred embodiment, the acquisition rates match. However, many controllable video sources, such as video tape players available by Sony, Panasonic, or JVC, can be set to display an image at 24 or 30 frames per second. Therefore, the background image can be acquired at 24 frames per second, the video tape player is set to generate the image at 30 frames per second, and the camera acquires the entire scene at 30 frames per second.

Figure 5:
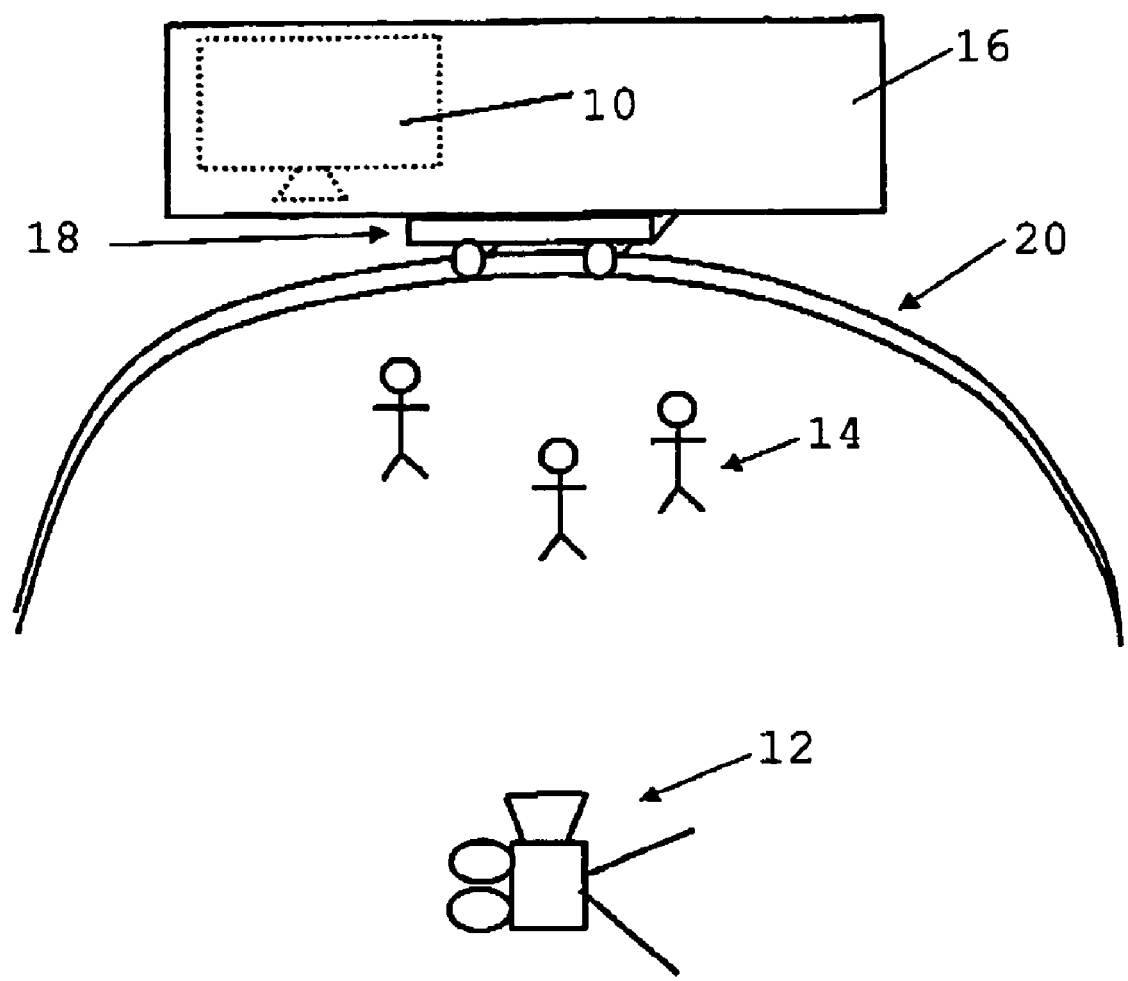
FIG. 5 illustrates the setup with the projector and projection screen on a trolley.

There are various embodiments possible with the setup shown in FIG. 1. FIG. 5 illustrates an alternative setup, wherein the rear-projection screen 16 and projector 10 are on a trolley 18 that moves along a rail 20. The rail 20 may be straight, curved (as in the figure), or of any configuration that allows the actors to move within a certain area. The rail 20 could be concave or convex, or have multiple curves within a single rail. As the actors 14 move within the stage area, the screen 16 and projector 10 is moved around as well to create various visual effects. The screen 16 and projector 10 may be on the same trolley 18 or separate trolleys. In addition, the camera 12 may be on a trolley traveling on a separate rail such that the point of view of the scene is maintained at substantially the same place as the scene moves. Also alternatively, the rails may be configured such that the trolleys move in more than one direction.

Figure 6:
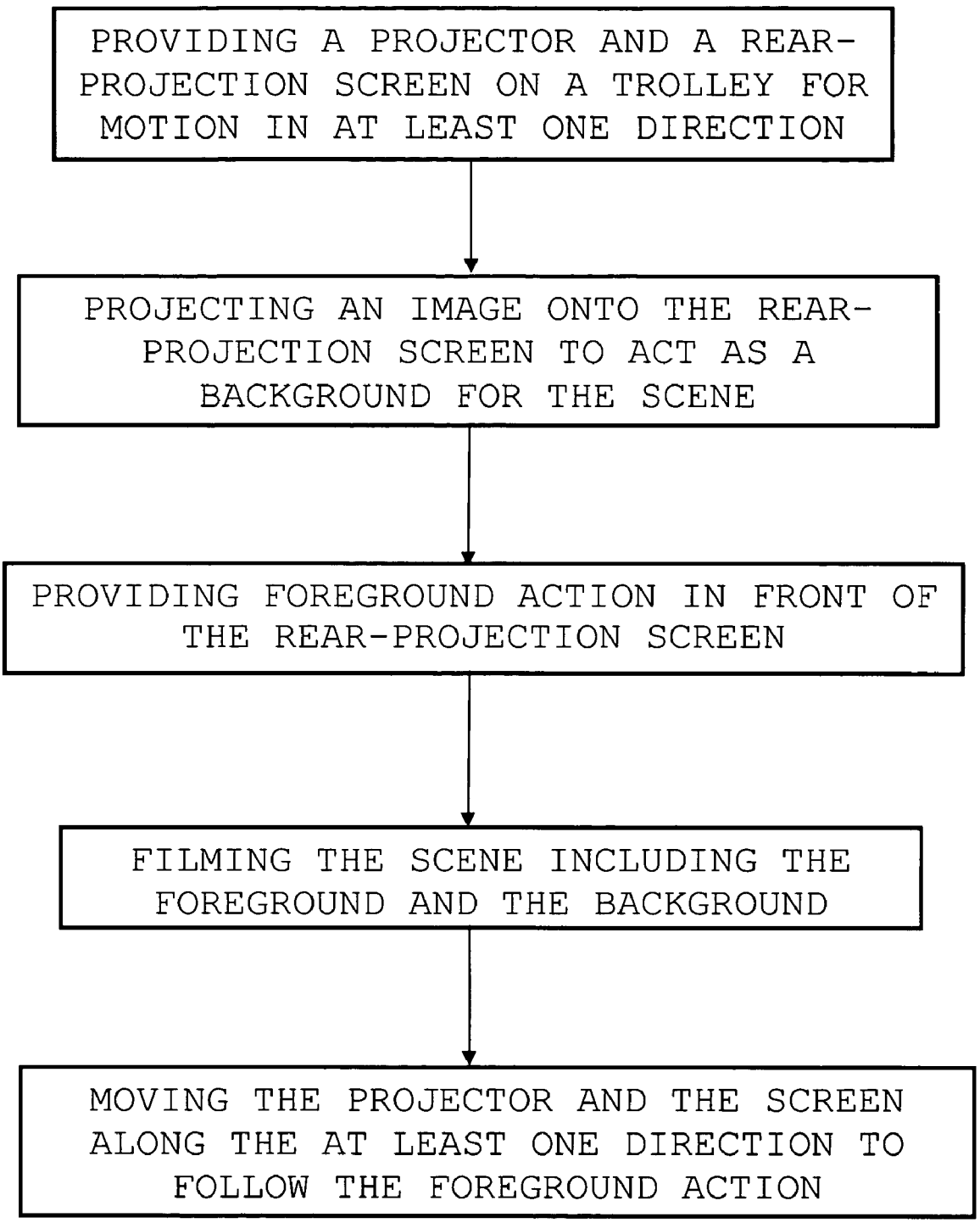
FIG. 6 is a flow chart of the method for filming an action scene.

FIG. 6 is a flow chart of a method for filming an action scene. The rear-projection screen and projector are provided on a trolley that moves in at least one direction. An image is projected onto the rear-projection screen to act as a background or the scene. Foreground action is provided in front of the rear-projection screen. The scene, including the background image and foreground action, is filmed. During the filming, the rear-projection screen and projector move in the at least one direction to follow the foreground action and remain substantially behind the action with respect to the point of view of the camera.

If the camera is also on a trolley traveling on a set of rails, the speeds of the two trolleys may be offset to create various visual effects.

The embodiments of the invention described above are intended to be exemplary only. The scope of the invention is therefore intended to be limited solely by the scope of the appended claims.

I claim:

1. A method for controlling a depth of field when filming a scene, the method comprising:
   providing a rear-projection screen behind a subject in a foreground;
   projecting an image onto said rear-projection screen to act as a background for said scene;
   filming said scene including said foreground and said background; and
   applying a varying degree of focus to a plurality of objects in said image as a function of a degree of focus of each of said objects for an intended distance between each of said objects and said subject.

2. A method as claimed in claim 1, wherein said applying a varying degree of focus comprises at least one of blending and overlaying at least two views to produce said image.

3. A method as claimed in claim 1, wherein said applying a varying degree of focus comprises changing a focus of all objects in said image.

4. A method as claimed in claim 3, wherein said applying a varying degree of focus comprises manually changing a degree of sharpness of said objects in said image.

5. A method as claimed in claim 3, wherein said applying a varying degree of focus comprises changing a scale of said objects in said image with respect to said subject in said foreground.

6. A method as claimed in claim 3, wherein said applying a varying degree of focus comprises dynamically changing said focus during said filming said scene.

7. A method as claimed in claim 3, wherein said applying a varying degree of focus comprises moving a projector to change a distance between said projector and said rear-projection screen.

8. A method as claimed in claim 3, wherein said applying a varying degree of focus comprises moving a camera to change a distance between said camera and said projection screen.

9. A method as claimed in claim 3, wherein said applying a varying degree of focus comprises combining a movement of a projector to change a distance between said projector and said rear-projection screen and movement of a camera to change a distance between said camera and said projection screen, such that a satisfactory degree of focus is obtained.

10. A method as claimed in claim 3, wherein said applying a varying degree of focus comprises adding filtering lenses to a projector projecting said background image.

11. A method as claimed in claim 1, wherein said projecting an image comprises projecting an image using a high resolution projector.

12. A method as claimed in claim 1, wherein said projecting an image comprises projecting an image using a digital projector.

13. A method as claimed in claim 1, wherein said filming said scene comprises filming using a digital camera.

14. A method as claimed in claim 1, wherein said filming said scene comprises filming using a film camera.

* * * * *